United States Patent
Naumann et al.

(10) Patent No.: US 11,207,800 B2
(45) Date of Patent: Dec. 28, 2021

(54) METHOD AND INSTALLATION FOR PRODUCING ROTOMOLDED PRODUCTS

(71) Applicant: ROTO evolution GmbH, Crimmitschau (DE)

(72) Inventors: Frank Naumann, Vollmershain (DE); Tino Peuker, Neukirchen/Pleisse (DE)

(73) Assignee: ROTO EVOLUTION GMBH, Crimmitschau (DE)

( * ) Notice: Subject to any disclaimer, the term of this patent is extended or adjusted under 35 U.S.C. 154(b) by 640 days.

(21) Appl. No.: 15/774,305

(22) PCT Filed: Nov. 8, 2016

(86) PCT No.: PCT/EP2016/077020
§ 371 (c)(1),
(2) Date: May 8, 2018

(87) PCT Pub. No.: WO2017/081030
PCT Pub. Date: May 18, 2017

(65) Prior Publication Data
US 2019/0275708 A1    Sep. 12, 2019

(30) Foreign Application Priority Data

Nov. 9, 2015   (DE) .................... 10 2015 119 203.9

(51) Int. Cl.
*B29C 33/36* (2006.01)
*B29C 41/06* (2006.01)
(Continued)

(52) U.S. Cl.
CPC ............ *B29C 31/006* (2013.01); *B29C 33/34* (2013.01); *B29C 33/36* (2013.01); *B29C 41/06* (2013.01);
(Continued)

(58) Field of Classification Search
CPC ......... B29C 33/34; B29C 41/04; B29C 41/06; B29C 41/042; B29C 41/045;
(Continued)

(56) References Cited

U.S. PATENT DOCUMENTS 2,946,092 A    7/1960 Yoder
3,115,680 A * 12/1963 Soderquist .............. B29C 33/34
425/162
(Continued)

FOREIGN PATENT DOCUMENTS

DE    7213361 U    7/1973
DE    29621628 U1 * 2/1997 ............. B29C 33/34
(Continued)

*Primary Examiner* — Atul P. Khare
(74) *Attorney, Agent, or Firm* — Hodgson Russ LLP

(57) ABSTRACT

The invention relates to a method for producing rotomolded products, and to an installation for carrying out such a method. The method is characterized by the simultaneous use of a plurality of spherical receptacle members, each without a dedicated rotary drive, each of which containing at least one molding die that is suppliable with raw material, and by the simultaneous use of a plurality of processing devices which are operated in a mutually independent manner, each for carrying out at least one of a plurality of production steps, using in each case one of the spherical receptacle members, wherein a plurality of processing devices which are configured as rotating stations are used in a temporally parallel or temporally overlapping manner, and/or wherein a plurality of processing devices which are configured as cooling stations are used in a temporally parallel or temporally overlapping manner, and/or wherein a plurality of processing devices which are configured as supply stations are used in a temporally parallel or temporally overlapping manner, and/or wherein a plurality of processing devices which are configured as retrieval stations are used in a temporally parallel or temporally overlapping (Continued)

manner, and wherein the spherical receptacle member conjointly with the content thereof and without the rotary drive is in each case retrieved from the processing device which has just terminated a processing step, said spherical receptacle member thereafter being fed to a processing device that is immediately vacant for the respective next processing step.

26 Claims, 7 Drawing Sheets

(51) Int. Cl.

| | | |
|---|---|---|
| *B29C 31/00* | (2006.01) | |
| *B29C 41/38* | (2006.01) | |
| *B29C 41/46* | (2006.01) | |
| *B29C 41/52* | (2006.01) | |
| *B29C 41/34* | (2006.01) | |
| *B29C 33/34* | (2006.01) | |
| *B29L 22/00* | (2006.01) | |

(52) U.S. Cl.
CPC .............. *B29C 41/34* (2013.01); *B29C 41/38* (2013.01); *B29C 41/46* (2013.01); *B29C 41/52* (2013.01)

(58) Field of Classification Search
CPC ............ B29C 41/047; B29C 2043/046; B29C 2045/1621; B29C 45/1628; B29C 31/006
See application file for complete search history.

(56) References Cited

U.S. PATENT DOCUMENTS

| | | | | |
|---|---|---|---|---|
| 3,704,084 A | | 11/1972 | Clay | |
| 4,690,626 A | * | 9/1987 | Krzepinski | B29C 33/36 414/152 |
| 5,406,059 A | * | 4/1995 | Nicetto | B22D 13/12 235/375 |
| 6,162,042 A | * | 12/2000 | Reinhardt | B29C 33/34 425/429 |
| 6,511,619 B1 | * | 1/2003 | Payne | B29C 33/36 264/255 |
| 6,555,037 B1 | | 4/2003 | Payne | |
| 7,875,224 B2 | * | 1/2011 | Gruber | B29C 43/04 264/250 |
| 10,005,201 B2 | * | 6/2018 | Naumann | B29C 41/04 |

FOREIGN PATENT DOCUMENTS

| | | | | |
|---|---|---|---|---|
| DE | 19702469 A1 | | 7/1998 | |
| DE | 102005014942 A1 | | 10/2006 | |
| EP | 0177906 A2 | | 4/1986 | |
| EP | 2093038 A1 | * | 8/2009 | ........... B29C 31/006 |
| EP | 2093038 A1 | | 8/2009 | |
| EP | 2918386 A1 | | 9/2015 | |
| GB | 2197819 A | * | 6/1988 | ............. B29C 41/06 |
| WO | WO-9638281 A1 | * | 12/1996 | ............. B29C 33/34 |
| WO | 2014000727 A2 | | 1/2014 | |

* cited by examiner

METHOD AND INSTALLATION FOR PRODUCING ROTOMOLDED PRODUCTS

CROSS-REFERENCE TO RELATED APPLICATIONS

The present application is the U.S. national phase of International Application No. PCT/EP2016/077020 filed Nov. 8, 2016, which claims priority of German Application No. 10 2015 119 203.9 filed Nov. 9, 2015, the entire disclosure of which is incorporated herein by reference.

FIELD OF THE INVENTION

The invention relates to a method for producing rotomolded products.

The invention moreover relates to an installation for carrying out such a method, and in particular to an installation for producing rotomolded products, which contains a plurality of spherical receptacle members, each without a dedicated rotary drive, each of which having at least one molding die that is suppliable with raw material.

BACKGROUND OF THE INVENTION

In order for rotomolded shaped bodies to be produced from plastics, it is necessary to rotate a molding die supplied with raw material and herein to heat said molding die to such a high temperature that the mainly pulverulent or granular, in particular micro-granular, raw material melts during the rotary process and is deposited on the internal wall of the molding die. The rotating movement herein must not be performed exclusively about a single rotation axis; rather, it is necessary to rotate the molding die in at least two dimensions.

A rotary device for rotomolded shaped bodies is known from WO 2014/00727 A2, said rotary device having a spherical receptacle device for at least one molding die, a holding device for the spherical receptacle device, and a drive unit for causing the rotating movement. The spherical receptacle device is composed of two parts and can be opened in a separation plane in order for the molding die to be supplied, or in order for the finished rotomolded shaped body to be retrieved from the molding die.

A rotomolding device in which a multiplicity of spherical receptacle members upon being supplied, in a manner similar to that of a conveyor belt, are continually and in temporally sequential manner conveyed first through a tunnel furnace and subsequently through a cooling chamber is known from U.S. Pat. No. 3,704,084. The spherical receptacle members herein run on two mutually parallel rotating shafts which set the spherical receptacle members in rotation.

This device has the disadvantage that all of the spherical receptacle members are rotated, heated, and cooled in the same way. Therefore, it is in practice not possible for rotomolded products of different types, for example rotomolded products of different sizes, and/or rotomolded products from different raw materials, for example different plastics, to be produced in a temporally parallel manner with such a device, because said rotomolded products of different types set different requirements in terms of the production parameters. The device known from the prior art cannot meet requirements of this type. Moreover, it is not possible for such a device to be reduced or increased in terms of the processing capacity, for example in order for the device in terms of the production capacity thereof to be adapted to changing order situations. The device known from the prior art is therefore economically usable only when said device is operated so as to be at all times utilized to the maximum possible capacity.

A rotomolding installation having processing stations that are disposed sequentially in a row is also known from DE 197 02 469 A1, said rotomolding installation having specifically a sintering furnace, a cooling chamber disposed downstream of the sintering furnace, and having a demolding station that is disposed downstream of the cooling chamber.

A molding machine for synthetic resin items is known from DE 72 13 361 U. In this machine, trucks having rotatingly driven molds are driven in a sequential manner on rails through a raw material filling section, a heating section, and a cooling section. Each of the trucks has a dedicated rotary drive.

An assembly of a rotary device having a manipulation station, having a single heating chamber and three cooling chambers, is known from EP 0 177 906 A2. The cooling chambers are disposed in a circular manner the heating chamber. A tool carrier configured as a truck can be driven in each case into the heating chamber and into each of the cooling chambers. Such a truck supports in each case a drive unit by way of which are rotatable tool for a double rotation is driven about two axes that are mutually perpendicular. This assembly of a rotary device is disadvantageously very complex to operate. In particular, a high energy input is required for the operation.

SUMMARY OF THE INVENTION

It is therefore the object of the present invention to specify a method for producing rotomolded products, which in a flexible manner is adaptable to the respective production requirements.

The object is achieved by a method which is characterized by
  the simultaneous use of a plurality of spherical receptacle members, each without a dedicated rotary drive, each of which containing at least one molding die that is suppliable with raw material, and by the simultaneous use of a plurality of processing devices which are operated in a mutually independent manner, each for carrying out at least one of a plurality of production steps, using in each case one of the spherical receptacle members, wherein
  a plurality of processing devices which are configured as rotating stations are used in a temporally parallel or temporally overlapping manner, and/or wherein a plurality of processing devices which are configured as cooling stations are used in a temporally parallel or temporally overlapping manner, and/or wherein a plurality of processing devices which are configured as supply stations are used in a temporally parallel or temporally overlapping manner, and/or wherein a plurality of processing devices which are configured as retrieval stations are used in a temporally parallel or temporally overlapping manner,
  and wherein the spherical receptacle member conjointly with the content thereof and without the rotary drive is in each case retrieved from the processing device which has just terminated a processing step, said spherical receptacle member thereafter being fed to a processing device that is immediately vacant for the respective next processing step.

It is a further object of the present invention to specify an installation for producing rotomolded products, which in a flexible manner is adaptable to the respective production requirements.

This object is achieved by an installation which is characterized by
a. a plurality of processing devices that are operable in a mutually independent manner and operate in a mutually independent manner, wherein each processing device carries out at least one production step, wherein a plurality of processing devices which are configured as rotating stations operate in a temporally parallel or temporally overlapping manner, and/or wherein a plurality of processing devices which are configured as cooling stations operate in a temporally parallel or temporally overlapping manner, and/or wherein a plurality of processing devices which are configured as supply stations operate in a temporally parallel or temporally overlapping manner, and/or wherein a plurality of processing devices which are configured as retrieval stations operate in a temporally parallel or temporally overlapping manner, and by
b. a conveyor which supplies the spherical receptacle members, in each case conjointly with the content and in each case without the rotary drive, in a mutually independent manner directly to the processing devices and in each case after a processing procedure receives said spherical receptacle members from the processing devices, wherein the spherical receptacle member, conjointly with the content thereof and without the rotary drive, is in each case retrieved by the conveyor from the processing device which has just terminated a processing step, and thereafter is supplied to a processing device that is immediately vacant for the respective next production step.

The invention has the very particular advantage that rotomolded products of different types, in particular rotomolded products of different sizes and/or different weights and/or different shapes, and/or rotomolded products from raw materials of different types, in particular from different raw materials which require different processing parameters, can be produced in a temporally parallel manner. This is achieved in particular by the use of a plurality of processing devices which are operated in a mutually independent manner.

As will be yet explained in detail hereunder, it is possible, for example, for a spherical receptacle member which contains a first type of molding die to be rotated in a temporally longer manner or at another temperature than another spherical receptacle member having another molding die which in another processing device is rotated and optionally heated in particular in a temporally parallel or temporally overlapping manner. As will likewise yet be explained in detail hereunder, the invention enables each rotomolded product to be produced very specifically by way of the production parameters that have been specially optimized for said rotomolded product, in particular in terms of the rotational movement, the rotation duration, the heating temperature, or the cooling temperature, wherein it is advantageously also possible for basic materials of different types, for example plastics which have dissimilar melting temperatures, to be used for different rotomolded products.

The installation according to the invention for producing rotomolded products moreover has the very particular advantage that said installation operates in a highly energy efficient manner. This is particularly because in each case exclusively one spherical receptacle member conjointly with the content thereof, but in particular without a rotary drive, is transferred to the individual processing devices and is heated or cooled therein. A continually alternating and energy-intensive heating and cooling of rotary drives is thus effectively avoided. To this extent, it is provided in the case of one advantageous embodiment that a plurality of the processing devices have in each case one dedicated rotary drive for rotating in each case one receptacle member, and/or that all of the processing devices have in each case one dedicated rotary drive for rotating in each case one receptacle member. It is therefore advantageously avoided that each receptacle member is assigned a dedicated drive unit, the latter in each case, conjointly with the receptacle member, having to be transported from one processing device to another processing device.

The installation according to the invention for producing rotomolded products moreover has the very particular advantage that said installation can be extended or downsized in an almost arbitrary manner. In order for such an installation to be extended, it is substantially necessary only for further processing devices to be added, and for it to be ensured that the conveyor can transfer spherical receptacle members to said further processing devices when the latter are just vacant, or is able to retrieve receptacle members therefrom, respectively, when the respective processing step has been completed. In an analogous manner, it is of course also possible for the installation to be downsized by removing individual processing devices or simply by turning the latter off. In one particular embodiment herein it is only necessary to inform the control device which controls the conveyor as to which of the processing devices have been removed in order for the latter to no longer be served. For example, it is possible for the installation to be downsized in such a manner that said installation has only a single rotary device and a single cooling device, and a combined supply and retrieval station, all being served by the conveyor.

According to an independent aspect of the invention, the invention has the very particular advantage that an installation for producing rotary products can be assembled individually in the manner of a kit from separately operable processing devices for the respective production requirements of a production batch. It can in particular also be provided herein that at least one of the processing devices, in particular all of the processing devices, can also be operated in a dedicated manner individually and separately by an installation according to the invention. In particular, such a processing device can function simultaneously as a rotating station and as a cooling station, and optionally also as a supply station and as a retrieval station. By combining a plurality of processing devices of this type, and by networking the latter with a conveyor, in particular such as is described in yet more detail hereunder, an installation according to the invention can be assembled individually for producing rotomolded products so as to be specific to the requirements.

The spherical configuration of the receptacle members has the particular advantage that the receptacle members can be rotated and transported in a simple and efficient way. For example, a rotating station can have a plurality of guide bearings, in particular roller bearings, which define an operating position for rotatably mounting a spherical receptacle member. A spherical receptacle member can be rotated about the center thereof about an infinite number of axes by means of a drive device which, for example, by way of a drive wheel that rolls on the surface of the receptacle member transmits a torque to the receptacle member. Moreover, spherical receptacle members can be advantageously conveyed in a rolling manner, for example so as to roll on two parallel guide rails.

The spherical configuration of the receptacle members has the further particular advantage that no additional coupling, for example a bayonet coupling, is required for coupling a receptacle member to the rotary drive of the respective processing device. Rather, it is sufficient for the respective spherical receptacle member to be mounted in a rotatable manner in a processing station, for example by means of suitably disposed rollers, and for said spherical receptacle member to be brought in contact, in particular in a frictionally engaged manner, with one or a plurality of drive wheels.

It can advantageously be provided that at least one of the receptacle members, in particular each of the receptacle members, has at least one receptacle for at least one molding die. Such an embodiment has the particular advantage that the molding dies can be readily replaced, for example when after one production process of one rotary product, another rotary product is to be produced. Alternatively, it is also possible, for example, that a receptacle member is composed of exclusively a molding die and/or is connected to the molding die in a non-releasable manner.

In the case of a very particularly advantageous embodiment, at least one of the following production steps is carried out in each case by each of the processing devices: supplying at least one molding die of a receptacle member with a raw material in a processing device which is configured as a supply station; heating the receptacle member and/or at least the molding die of the receptacle member while the receptacle member is rotated, in a processing device which is configured as a rotating station; cooling the receptacle member and/or at least the molding die in a processing device which is configured as a cooling station; retrieving the rotomolded product from the molding die, in particular in a processing device which is configured as a retrieval station; rotating the receptacle member in a processing device which is configured as a rotating station.

As will be explained in yet more detail hereunder, the method according to the invention and the installation according to the invention can be used in particular for producing rotomolded products in the hot rotation method, for example while using thermoplastic plastics as the raw material. It can advantageously be provided herein that the receptacle member, or at least the at least one molding die thereof, in particular during rotating, is impinged with heating energy. However, it is also possible for the method according to the invention and the installation according to the invention for producing rotomolded products to be used in the cold rotation method while using cold-solidifying materials such as, for example, resins or concrete. In order for rotomolded products to be produced in the cold rotation method it is not necessary for the receptacle member to be heated. To this extent, no processing device which is configured as a cooling station is required in the production of rotomolded products in the cold rotation method. However, one processing device can advantageously function as a buffer station which can temporarily receive a receptacle member after a rotating procedure. In particular, a processing device which in the use of hot-melting raw material functions as a cooling station can be used as the buffer station when the installation is once operated in the cold rotation method. The following description of the invention, even when the latter at some points in an exemplary manner relates to hot rotation, to this extent very generally and in an analogous manner also applies to the production of rotomolded products in the cold rotation method, In the case of one particular embodiment of the method according to the invention, a plurality of processing devices which are configured as rotating stations are used in a temporally parallel or temporally overlapping manner. For example, the conveyor can transfer a first spherical receptacle member, the molding die thereof already having been supplied, to a first rotating station, while the molding die of a second spherical receptacle member is simultaneously supplied, such that the conveyor subsequently, after having transferred the first receptacle member to the first rotating station, can retrieve the second receptacle member, for example from a supply station, and transfer said second receptacle member to a second rotating station.

Alternatively or additionally, it can also be advantageously provided that a plurality of processing devices which are configured as cooling stations are used in a temporally parallel or temporally overlapping manner. For example, the conveyor can retrieve a first spherical receptacle member, the rotating and heating procedure thereof being completed, from the respective rotating station and transfer said first spherical receptacle member to a first cooling station, while another receptacle member, or at least the molding die thereof, is already being cooled in a temporally parallel manner in another cooling station.

In an analogous manner, it can advantageously be provided that a plurality of processing stations which are configured as supply stations are used in a temporally parallel or temporally overlapping manner, and/or that a plurality of processing devices which are configured as retrieval stations are used in a temporally parallel or temporally overlapping manner. However, in practice it is such that fewer supply stations and retrieval stations are required than rotating stations and cooling stations, because supplying the molding die and retrieving the finished rotomolded product from the molding die typically requires less time than the rotating procedure including heating, and than the cooling procedure. It can be quite sufficient in particular for smaller installations for a single processing device to function as a supply station as well as a retrieval station, while moreover a plurality of rotating stations and a plurality of cooling stations form part of the installation and are operated as such.

In the case of one particular embodiment the processing stations, in particular different processing stations for sequential production steps, are not disposed sequentially in a row; however, such an arrangement is in principle also possible.

As has already been mentioned, it can be advantageously provided that the individual steps of supplying with raw material, of rotating and heating, of cooling, and of retrieving the finished rotomolded product are carried out in a temporally overlapping and/or so as to be cyclically repeated, using a multiplicity of spherical receptacle members. In particular, for example, a first receptacle member can just be supplied with new raw material, while a second receptacle member is already being heated and rotated in a rotating station, and while a third receptacle member is just cooling in a cooling station, in particular while simultaneously carrying out a rotating movement. As soon as the molding die of the first receptacle member, or the plurality of molding dies of the first receptacle member, respectively, has/have been supplied, said receptacle member, in particular in an automatically controlled manner, by means of the conveyor can be transported to a further, immediately vacant rotating station, without the processing procedures in the other processing devices being influenced on account thereof. In particular, the first receptacle member can be fed to the free rotating station directly and without a detour by way of a further processing device.

In an analogous manner, it can in particular be advantageously provided that whenever a processing procedure at one of the processing devices is completed, the respective spherical receptacle member is retrieved from said processing device and is, preferably directly, transferred to an immediately vacant processing device which is capable of carrying out the next processing step required. In this way it is advantageously achieved that the entire production process does not depend on the receptacle member having that molding die which has the longest processing times, as this would be the case in a continual conveyance of the receptacle member such as is known from the prior art. Rather, in a very particularly advantageous way, it is possible for a spherical receptacle member to overtake another spherical receptacle member during the production process. In particular, it can be advantageously provided that while one spherical receptacle member is just being processed in one processing device, other spherical receptacle members are supplied to other processing devices and/or are retrieved from other processing devices, and/or other spherical receptacle members are processed in other processing devices.

In the case of one particular embodiment, a rotating station which is used exclusively as a rotating station is used. Alternatively or additionally, it can also be provided that at least one cooling station is used exclusively as a cooling station. In particular, it can be advantageously provided that an installation for producing rotomolded products has a plurality of rotating stations which function exclusively as rotating stations (in particular as rotating stations in which heating is simultaneously performed during rotating), and moreover has a plurality of cooling stations which function exclusively as cooling stations. Such an embodiment has the particular advantage that the individual processing devices can be built as specialized processing devices of a more simple construction. The cooling in the cooling station is preferably performed while simultaneously rotating the spherical receptacle member. To this extent, the cooling devices preferably have a device for rotating the spherical receptacle member to be cooled. Rotating during the cooling ensures that the raw material is maintained in the desired shape until a sufficient strength has been achieved.

Alternatively, however, it can also be provided that a rotating station is additionally also configured so as to function as a cooling station and is utilized as a cooling station when an immediately vacant cooling station is required. Alternatively or additionally, it can also be provided in an analogous manner that a cooling station is additionally configured to function as a rotating station and is utilized as a rotating station when an immediately vacant rotating station is required. Alternatively or additionally, it can be provided in a likewise analogous manner that a supply station is additionally also configured to function as a retrieval station and is utilized as a retrieval station when a vacant retrieval station is required after a cooling step, and/or that a retrieval station is additionally also configured to function as the supply station and is utilized as the supply station when an immediately vacant supply station is required after a retrieval step. Embodiments of this type are in particular expedient for smaller installations for producing rotomolded products, or for installations which are often downsized or extended. A particular flexibility in the assembly of the respectively required installation for producing rotomolded products is achieved in particular by virtue of the multiple functionalities of the individual processing devices.

In particular in the case of comparatively small installations for producing rotomolded products it is often sufficient for a single processing device to be used as a supply station as well as a retrieval station, and moreover no further supply station and no further retrieval station is present. The use of a single processing device as a supply station and as a retrieval station in the case of comparatively small installations which, for example, has only a single-digit number of rotating stations and cooling stations, is therefore possible because the time required for supplying and retrieving is typically significantly shorter than the time required for heating and rotating, and for cooling. This applies in particular when supplying and retrieving, as is explained in yet more detail further below, is performed automatically by a machine, for example a robot.

In order for the molding dies of the individual spherical receptacle members to be supplied, the supply station can have an automatic device which in particular is configured so as to initially open the receptacle member.

For example, the receptacle member can have two mutually separable sphere-halves, such that the upper sphere-half can be raised once the contact plane in which the sphere-halves contact one another has been horizontally aligned. Alternatively, the spherical receptacle member can have two sphere-halves, for example, which are connected by a hinge such that the spherical receptacle member can be folded open in order for the molding die, or the molding dies, respectively, to be accessed. To this extent, it can very generally be advantageously provided that the automatic device automatically opens the respective spherical receptacle member and automatically closes the latter again after a supply procedure. When the supply station simultaneously also functions as a retrieval station, it can be advantageously provided that the automatic device opens the respective spherical receptacle member for a retrieval of the finished rotomolded product, or of the finished rotomolded products, respectively, and subsequently fills fresh raw material into the molding die, or the molding dies, respectively, and thereafter, in particular automatically, closes the spherical receptacle member again.

As has already been mentioned, the invention has the very particular advantage that each molding die, or each molding die type, can in each case be specifically assigned a raw material type and/or a raw material quantity per filling such that each molding die at the beginning of each process run can be, in particular automatically, filled with raw material of the specifically assigned raw material type of the specifically assigned raw material quantity. For example, it is possible that a first receptacle member has a particularly small molding die into which a minor quantity of raw material has to be placed, while another receptacle member has a larger molding die which has to be supplied with a larger quantity of raw material in order to guarantee that the rotomolded product to be produced has a sufficient wall thickness at all points.

For example, each receptacle member and/or each molding die can be marked, in particular so as to be machine-readable, such that it is identifiable, for example for an automatic supply device, by way of which raw material and by way of which raw material quantity supplying has to be performed. As will be explained in yet more detail further below, the receptacle member and/or the respective molding die can have an in particular machine-readable code, for example an optically scannable barcode or QR code, or an RFID code, which either contains directly information pertaining to the raw material type to be used and/or to the raw material quantity, or which makes it possible to check, in particular automatically, in a database of a central controller as to which raw material type and which raw material quantity are assigned specifically to the receptacle member and/or the molding die or molding dies, respectively, thereof.

As has already been mentioned, it can be advantageously provided that different receptacle members are processed in the processing devices while taking into account respective specific processing parameters which may differ from one receptacle member to another receptacle member. To this end it is required in particular in the case of an automatic installation, that the individual processing devices and/or a central control device, despite a potentially identical external shape (for example a spherical shape) of the receptacle members is informed as to which processing parameters apply to the respective receptacle member. To this extent, it can be advantageously provided that each receptacle member is individually assigned a set of processing parameters, and the receptacle members in the processing devices to which said receptacle members have been supplied are processed while adhering to the respective processing parameters specifically assigned. It can be provided herein, for example, that each receptacle member is individually assigned a set of processing parameters, the latter being stored in a database, and/or that each receptacle member is individually assigned a set of processing parameters, the latter being stored, in particular in a machine-readable form, on or in the receptacle member.

When a set of processing parameters is assigned to a receptacle member and stored in a database, it is advantageous for the receptacle member to be marked with an in particular machine-readable code which permits the respective processing device to check in the database as to which of the specific processing parameters are to be adhered to by said processing device in the processing of the respective receptacle member.

As has already been mentioned, alternatively to an assignment of the processing parameters to a database, it can also be provided that the processing parameters specific to a receptacle member are stored directly in a code on or in the receptacle member.

The code can be attached, for example, as an optically scannable barcode or QR code on the receptacle member, or can be transmitted, for example, as an RFID code. Alternatively or additionally, it is also possible for example, that the receptacle member and/or the molding die thereof contains a transponder which transmits the code wirelessly. There are ultimately no limits in terms of the transmission of information. To this extent, a transmission of information pertaining to the code or pertaining directly to the processing parameters can be performed in diverse ways, optically, acoustically, or wirelessly.

A set of processing parameters for a receptacle member can in particular contain information pertaining to a rotation duration and/or a rotation movement pattern.

In particular, it can be advantageously provided that a processing parameter relates to a furnace temperature. The furnace temperature is the temperature within the rotary device. In particular, a processing parameter can relate to an upper operating temperature of the molding die, for example. This herein is the temperature which a molding die must have during the rotating procedure in order for the hot-melting raw material to be deposited on the internal walls of the molding die. The temperature of the molding die can be, in particular automatically, monitored and/or controlled by means of a pyrometer, for example.

In particular, a processing parameter can relate to, for example, a lower operating temperature of the molding die. This herein is the temperature which the molding die must have at the end of a cooling procedure, in particular prior to the rotomolded product being able to be retrieved.

Heating the respective receptacle member and/or the molding die(s) thereof can be performed in particular by blowing hot air. To this extent, a processing parameter can relate to a flow velocity of a hot air flow for heating a molding die and/or to a hot air temperature.

Cooling, in particular in a cooling station, can be performed in particular by blowing cold air. To this extent, a processing parameter can relate to a flow velocity of a cold airflow for cooling a molding die and/or to a cold air temperature.

Alternatively or additionally, a set of processing parameters for a receptacle member can in particular relate to information pertaining to a heating temperature and/or to a heating time and/or to a cooling time and/or to a nominal alignment for the retrieval of the rotomolded product and/or to a nominal alignment for supplying the molding die and/or to a raw material property, in particular a raw material quantity or a raw material color or a raw material type. Each processing device can advantageously operate, independently or by way of a central control unit, while using the processing parameters specific to the respective receptacle member to be processed.

As has already been mentioned, it can be advantageously provided that the receptacle members are transported intermittently and/or asynchronously between the processing devices. In a manner different from that of a continuous conveying stream, this advantageously enables the individual receptacle members to be processed individually and specifically according to dedicated processing parameters. However, this does not preclude that conveyor, in particular in portions, comprises a conveyor belt or a uni-dimensional ball track.

In the case of one particularly advantageous embodiment, the receptacle members prior to the retrieval of the rotomolded product are in particular automatically oriented in a specific alignment. This alignment is preferably chosen such that particularly simple opening of the receptacle member is enabled. It is particularly advantageous, in particular in the case of an embodiment which has spherical receptacle members having in each case two sphere-halves, that the spherical receptacle members prior to the retrieval of the rotomolded product, or the rotomolded products, respectively, are in each case in particularly automatically aligned such that the separation line between the two sphere-halves is horizontally aligned. It can advantageously also be preset herein as to which of the two sphere-halves is to be oriented toward the top and which is to be oriented toward the bottom. An alignment device can be, for example, part of the conveyor, or be disposed directly on the conveyor. Alternatively, it is also possible for the alignment station to be part of a retrieval station, or to be disposed directly on a retrieval station.

In the case of one particular embodiment, the installation for producing rotomolded products additionally has a lock which is configured and disposed for receiving one of the spherical receptacle members from the conveyor and/or for transferring another of the spherical receptacle members to the conveyor, and which enables spherical receptacle members to be moved through the lock out of the processing procedure and/or for spherical receptacle members to be moved through the lock into the processing procedure. Such a lock can be configured as a lock entry station or as a lock exit station. In particular for comparatively small installations, it is also possible for one and the same station to function as a lock entry station as well as a lock exit station.

Such a lock has the particular advantage that individual spherical receptacle members, for example when the latter are defective or are to be equipped with other molding dies, can be retrieved from the production process and be added to the latter again without the entire installation having to be temporarily completely stopped. As opposed thereto, retrieving and adding spherical receptacle members can be advantageously performed in the ongoing production process by means of at least one lock.

There are no substantial limitations in terms of the configuration of the conveyor. The conveyor can thus, for example, have a linear conveyor and/or a conveying track and/or a roller ball track, and/or at least one, in particular rotatably mounted, transport arm. Alternatively or additionally, it can also be provided that the conveyor has at least one gripper for gripping one of the receptacle members, and/or that the conveyor is configured as an intermittent conveyor. In particular, as has already been mentioned, it can be advantageously provided that the conveyor transports the receptacle members asynchronously between the processing devices. The conveyor can in particular also be configured as a robot, in particular as an industrial robot.

In the case of one particularly space-saving embodiment, the processing stations are distributed over at least two different horizontal planes.

BRIEF DESCRIPTION OF THE DRAWING VIEWS

The subject matter of the invention is schematically illustrated in an exemplary manner in the drawing, and will be described hereunder by means of the figures, wherein the same or functionally equivalent elements are in most instances provided with the same reference sign. In the drawing.

DETAILED DESCRIPTION OF THE INVENTION

Figure 1:
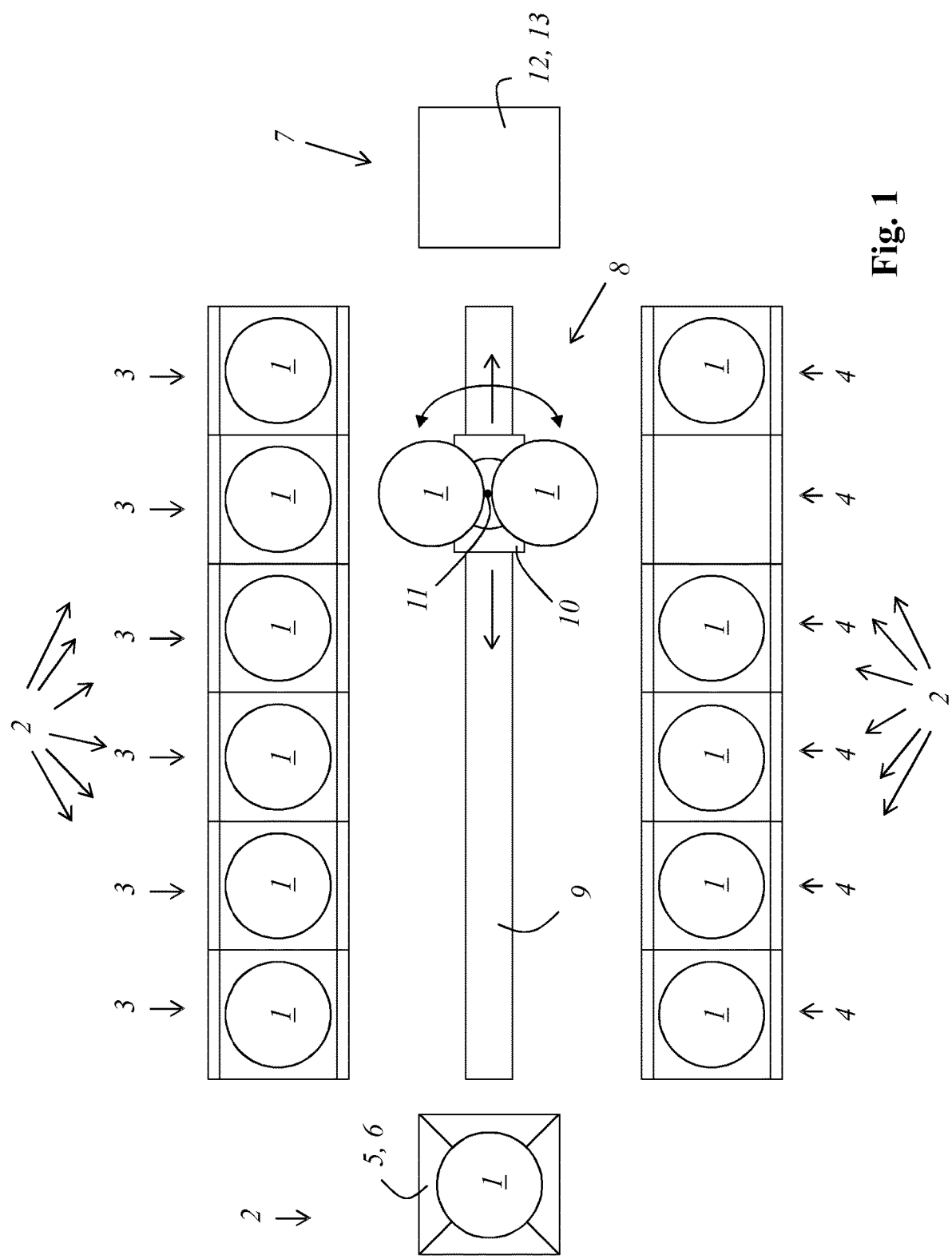
FIG. 1 shows a first exemplary embodiment of an installation according to the invention for producing rotomolded products.

FIG. 1 shows a first exemplary embodiment of an installation for producing rotomolded products, which contains a plurality of spherical receptacle members 1 of the same type, each of which having at least one receptacle (not illustrated) having one molding die (not illustrated). The installation moreover has a plurality of processing devices 2 that are operable in a mutually independent manner and operate in a mutually independent manner.

The processing devices of a first group are configured as rotating stations 3. Each of the rotating stations 3 can receive a spherical receptacle member 1, and impinge the latter, or at least the molding die of the latter, with energy for a heating procedure, and rotate the spherical receptacle member 1, in particular according to a rotational movement pattern that is predefined individually and specifically for the spherical receptacle member 1 to be just rotated.

The installation moreover has a second group of processing devices 2 which are configured as cooling stations 4. Each of the cooling stations 4 can receive one of the spherical receptacle members 1, and cool the latter, or at least the molding die thereof, for example by blowing cooled air.

The installation for producing rotomolded products moreover has a processing device 2 which functions as a supply station 5 as well as retrieval station 6. The installation moreover has a lock 7 which enables one of the spherical receptacle members 1 to be in each case moved through the lock out of the ongoing production process, or for a spherical receptacle member 1 to be moved through the lock into the ongoing production process. The lock 7 functions as a lock entry station 12 as well as a lock exit station 13.

The installation moreover has a conveyor 8 which is capable of feeding the spherical receptacle members 1 to the processing devices 2 in a mutually independent manner, and in each case after a processing procedure of receiving said spherical receptacle members 1 from the processing devices 2 in a mutually independent manner. The conveyor 8 contains a linear conveyor having a guide track 9 on which a slide 10 is disposed so as to be movable in a linear manner. The slide 10 supports two transport arms (not illustrated) which conjointly can be rotated about a rotation axis 1I. A gripper (not illustrated) for gripping a spherical receptacle member 1 is disposed at the end of each of the transport arms.

The conveyor 8 can retrieve a spherical receptacle member 1 from the combined supply station and retrieval station 5, 6, the molding die of said spherical receptacle member 1 in the combined supply station and retrieval station 5, 6 just having been in particular automatically supplied with raw material. To this end, the transport arms are rotated by 90 degrees from the position illustrated in FIG. 1, and the slide 10 is displaced completely to the left. After retrieving, the conveyor 8 can feed the retrieved spherical receptacle member 1 to an immediately vacant rotating station 3. To this end, the rotation arms are again rotated by 90 degrees in such a manner that the retrieved spherical receptacle member now faces the rotary devices 3. The slide 10 for transferring the spherical receptacle member is displaced in a linear manner until said slide 10 is disposed so as to be opposite the vacant rotating station 3.

When the rotating and heating process relating to one of the spherical receptacle members in one of the rotating stations 3 is completed, the respective spherical receptacle member 1 is retrieved from the respective rotating station 3. The transport arms of the conveyor 8 are subsequently rotated by 180 degrees such that the spherical receptacle member 1 that has just been retrieved from the rotating station 3 now faces the cooling stations 4. The slide 10 of the conveyor 8 is now repositioned in a linear manner until the spherical receptacle member 1 that has been retrieved from the rotating station 3 and is now to be cooled is opposite a vacant cooling station 4. The spherical receptacle member 1 to be cooled is subsequently transferred to the vacant cooling station 4.

When the molding die of a spherical receptacle member 1 has been sufficiently cooled, the conveyor can retrieve the respective spherical receptacle member 1 from the respective cooling station 4 and transfer said spherical receptacle member 1 to the combined supply and retrieval station 5, 6, wherein the transport arms after retrieving are pivoted by 90 degrees.

The transferred spherical receptacle member 1 in the combined supply and retrieval station 5, 6 is initially aligned in a predefined orientation. This enables the spherical receptacle member 1 to be able to be in particular automatically opened in a simple and uncomplicated manner. For example, after aligning, an upper sphere-half of the spherical receptacle member 1 can be raised or folded out in order for the molding die, or the molding dies, respectively, to be rendered accessible. After opening the spherical receptacle member 1, the finished rotomolded products can be in particular automatically retrieved and, for example, deposited on a conveyor belt (not illustrated) or sorted into a transport box.

After retrieving, the molding die of the spherical receptacle member 1 which is located in the combined supply and retrieval station 5, 6, can be in particular automatically supplied with fresh raw material. In particular, it can be advantageously provided herein that the combined supply and retrieval station 5, 6 fills a quantity of raw material that is specific precisely to this molding die of a type of raw material that is specific precisely to this molding die into the molding die. The same applies in analogous manner of course to each molding die when the spherical receptacle member 1 contains a plurality of molding dies.

Figure 2:
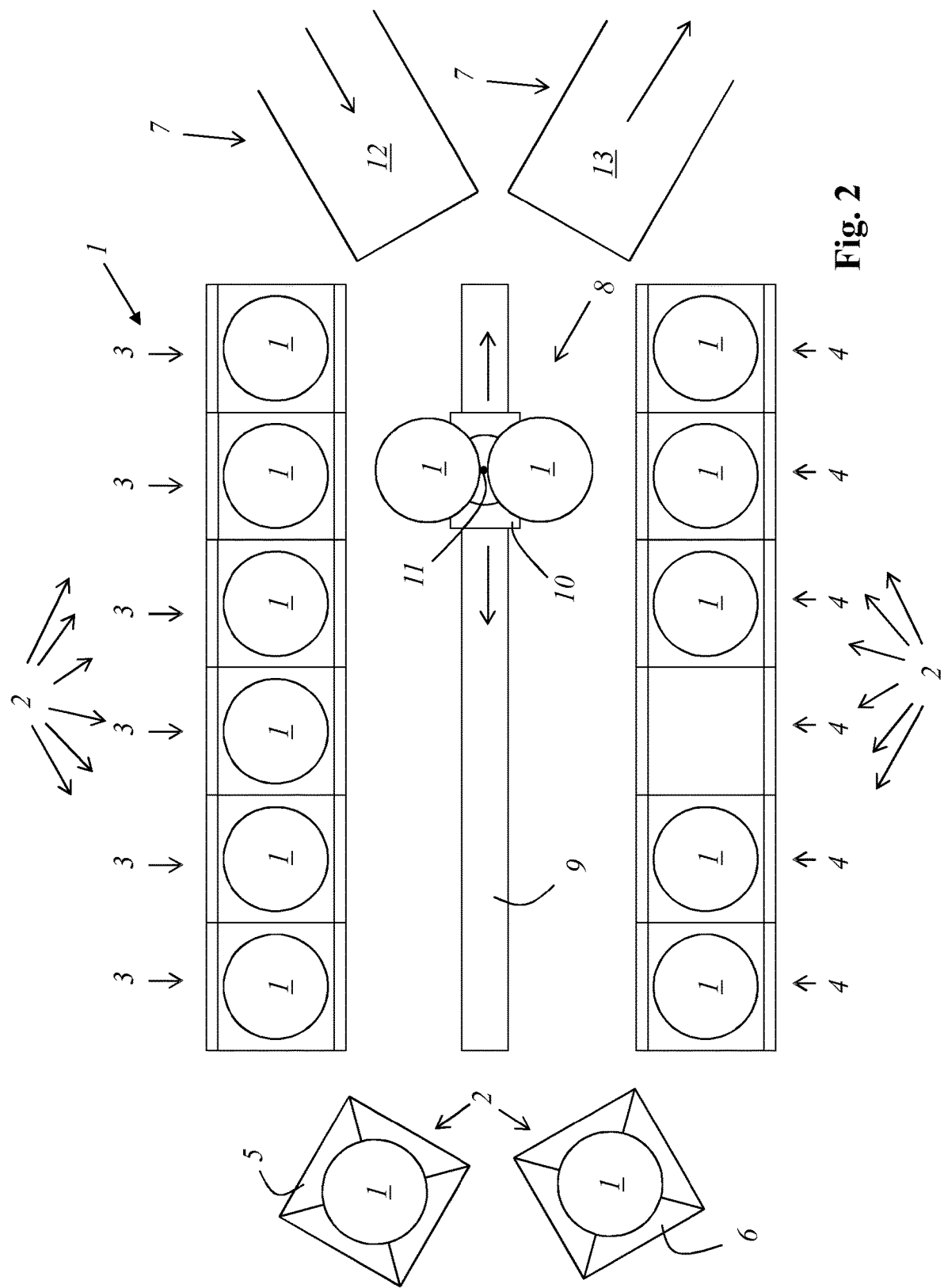
FIG. 2 shows a second exemplary embodiment of an installation according to the invention for producing rotomolded products.

FIG. 2 shows a second exemplary embodiment of an installation according to the invention for producing rotomolded products. Said second exemplary embodiment differs from the installation illustrated in FIG. 1 in that instead of a combined supply and retrieval station 5, 6, separate processing devices 2, specifically a supply station 5 which functions exclusively as a supply station, and a retrieval station 6 which functions exclusively as a retrieval station 6, are present.

In the case of this embodiment, a spherical receptacle member 1 after cooling is in each case initially transferred to the retrieval station 6 and therein aligned such that the rotomolded products can be retrieved. After retrieving, the conveyor 8 transports the respective spherical receptacle member 1 to the supply station 5 where the molding die, or the molding dies, respectively, of the spherical receptacle member 1 are supplied with fresh raw material, in particular especially according to specific parameters for this molding die, or molding dies, respectively. The spherical receptacle member 1 having the freshly supplied molding die can subsequently be transferred to a rotating station 3 again. Between the steps visualized, the transport arms of the conveyor 8 for transferring, or for retrieving, respectively, the spherical receptacle member 1 are in each case rotated by 60 degrees.

The installation shown in FIG. 2 moreover differs from the installation illustrated in FIG. 1 in that a lock 7 is provided, the latter having a lock entry station 12 and a lock exit station 13. The lock entry station 12 is configured very specifically for moving in through the lock a spherical receptacle member 1, while the lock exit station 13 is configured very specifically for moving out through the lock a spherical receptacle member 1.

Figure 3:
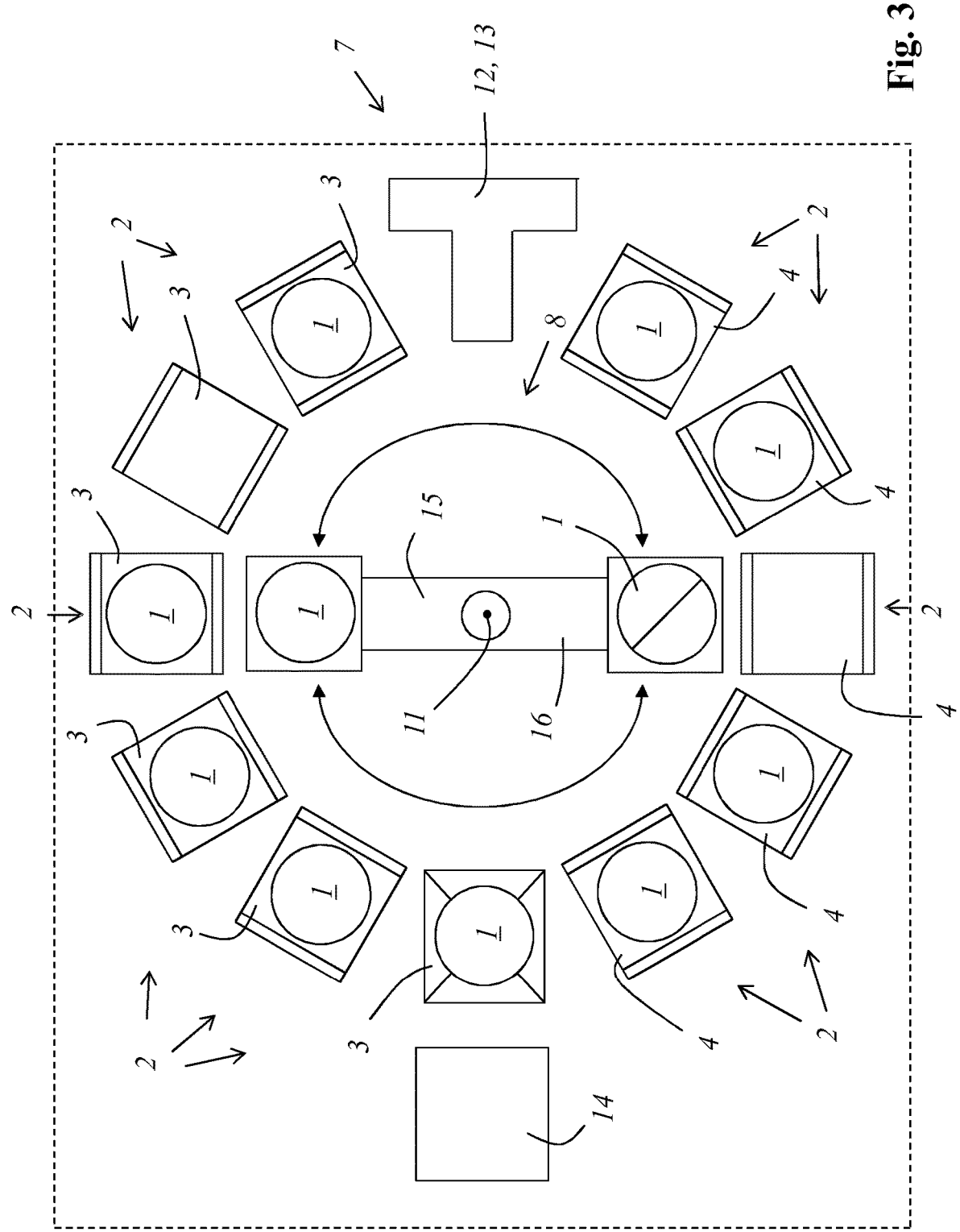
FIG. 3 shows a third exemplary embodiment of an installation according to the invention for producing rotomolded products.

FIG. 3 shows a third exemplary embodiment of an installation according to the invention for producing rotomolded products. The installation has a plurality of processing devices 2 which are set up in a circle. Also in this installation, there are processing devices 2 which are configured specifically as rotating stations 3, and processing devices 2 which are configured specifically as cooling stations 4. Moreover, there is a combined supply and retrieval station 5, 6 which has a retrieval robot 14. There is furthermore a lock 7 which functions as a lock entry station 12 as well as a lock exit station 13.

The conveyor 8 has two fixedly interconnected transport arms 15, 16 which are mounted so as to be rotatable about a rotation axis 11. A gripper (not illustrated) for gripping in each case one spherical receptacle member 1 is disposed at the ends of each transport arm 15, 16. An alignment device (not illustrated), in order to be able to align a gripped spherical receptacle member 1 in a predefined orientation, in particular for retrieving or supplying, is additionally present on the transport arm 16. It is provided herein that the conveyor 8 in each case aligns the spherical receptacle member 1 to be transferred to the combined supply and retrieval station 5, 6, before said receptacle member 1 is transferred.

For retrieving or transferring a spherical receptacle member 1 to one of the processing devices 2, the transport arms 15, 16 are in each case rotated in such a manner until the respective free end of which the gripper is now to retrieve or transfer a spherical receptacle member 1, is disposed so as to be opposite the respective processing device 2.

Figure 4:
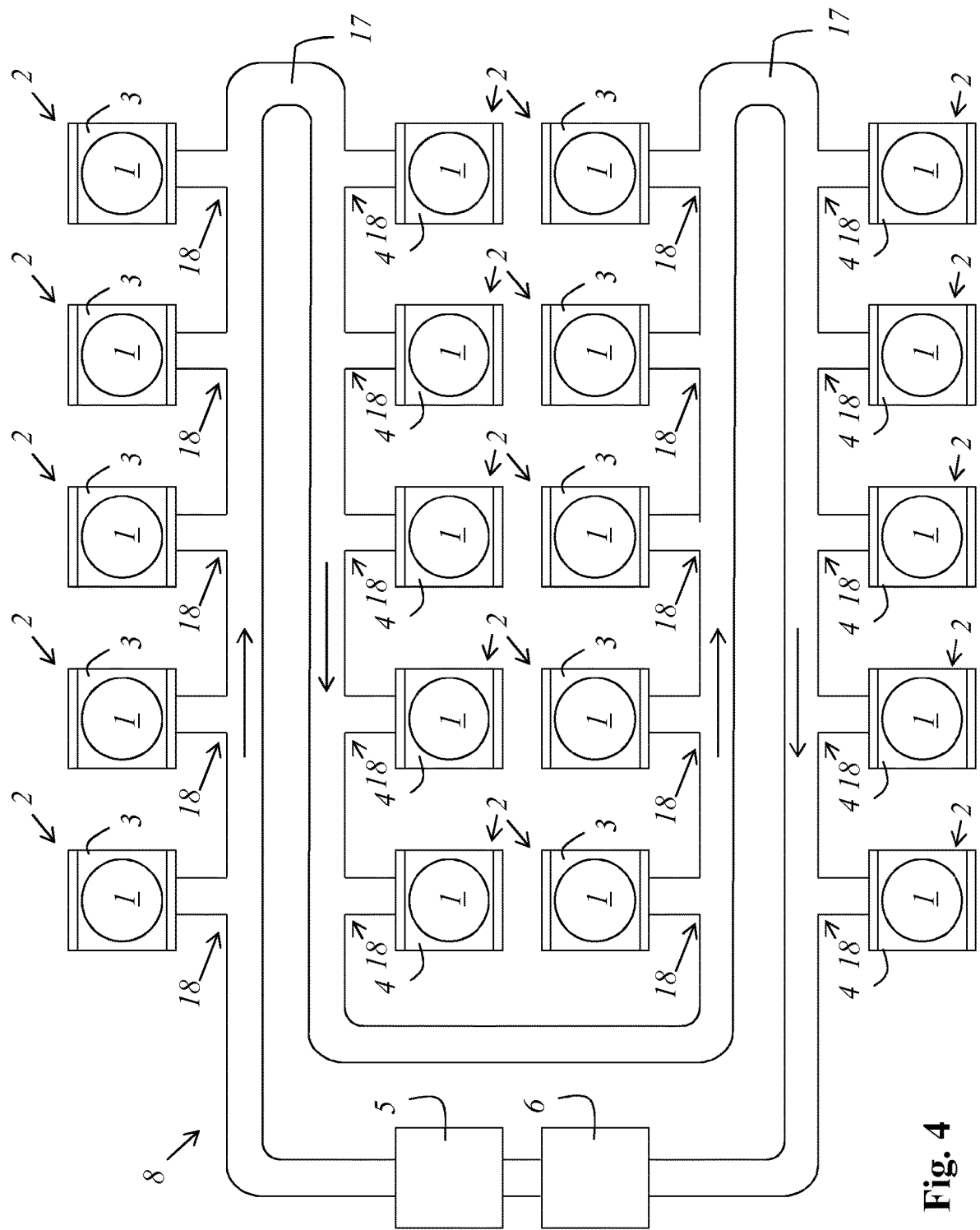
FIG. 4 shows a fourth exemplary embodiment of an installation according to the invention for producing rotomolded products.

FIG. 4 shows a fourth exemplary embodiment of an installation according to the invention for producing rotomolded products. The installation has a plurality of processing devices 2, some of which being configured as a rotating station 3, and others as a cooling station 4. Moreover, one of the processing devices is configured as a supply station 5, and another of the processing devices 2 is configured as a retrieval station 6. The conveyor 8 has an endless roller ball track 17, along which the spherical receptacle members 1, for example driven by a transport belt, can roll along. In each case one switchable turnout 18 leads from the roller ball track 17 to each of the processing devices 2. In this way, each of the spherical receptacle members 1 can be fed in a targeted and individually controlled manner to each of the processing devices 2, depending on the immediately required processing step.

After having being supplied with raw material in the supply station 5, the freshly equipped spherical receptacle member 1 is transported on the ball track 17 until said ball track 17 reaches a vacant rotating station 3. The turnout 18 that is disposed upstream of the vacant rotating station 3 is then switched such that the freshly supplied spherical receptacle member 1 is guided to the vacant rotating station 3. After completion of the rotating and heating procedure, the spherical receptacle member 1 makes its way back onto the roller ball track 17 and thereon is conveyed onward until said roller ball track 17 reaches a vacant cooling station 4. The turnout 18 that is assigned to the vacant cooling station 4 is then switched such that the spherical receptacle member 1 is fed to the vacant cooling station 4. After the cooling procedure, the spherical receptacle member makes its way back onto the ball track 17 and finally reaches the retrieval station 6 where the finished rotomolded product is retrieved. The spherical receptacle member 1 is subsequently transferred to the supply station 5 again, such that the entire procedure can now be repeated.

Figure 5:
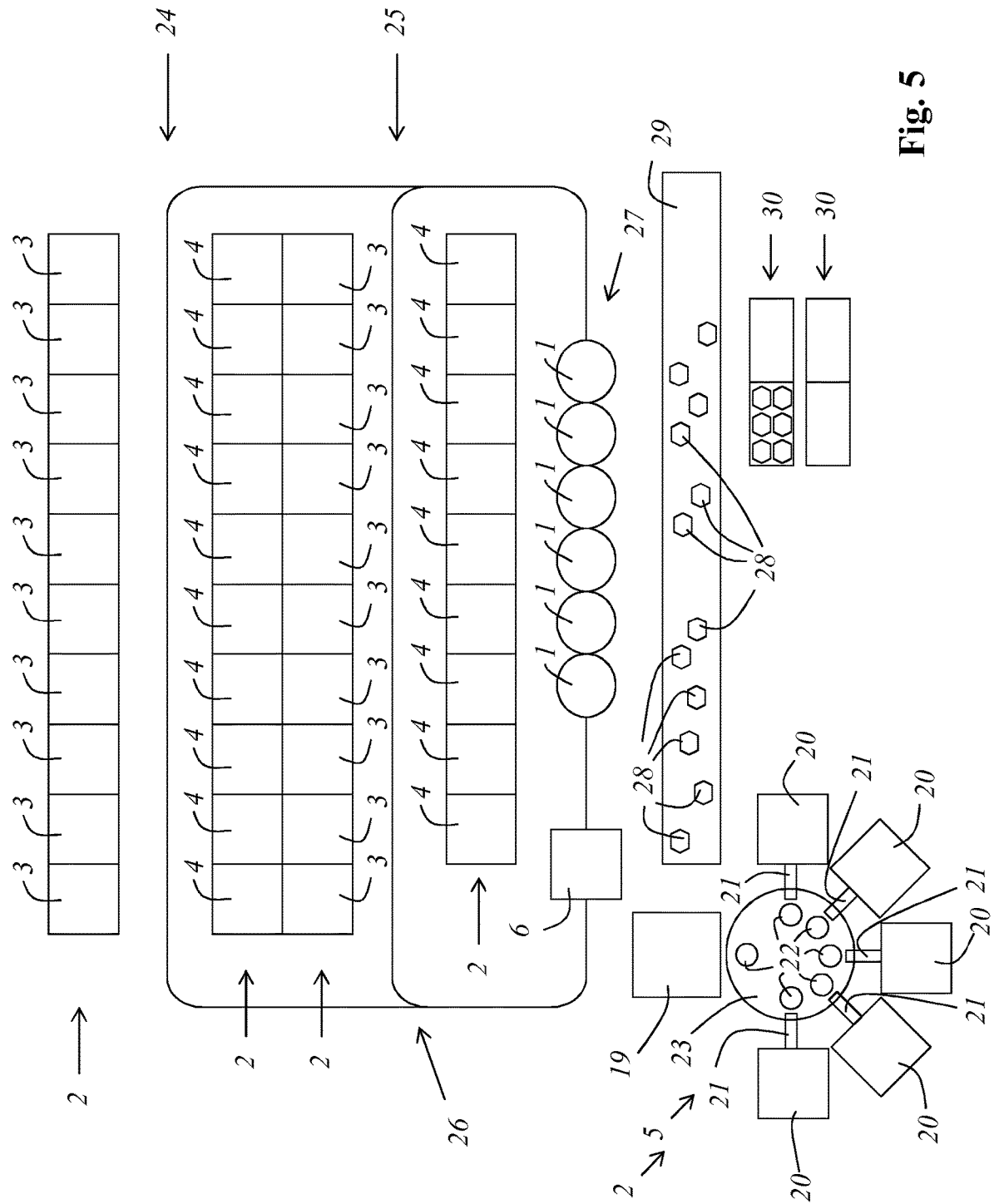
FIG. 5 shows a fifth exemplary embodiment of an installation according to the invention for producing rotomolded products.

FIG. 5 shows a fifth exemplary embodiment of an installation according to the invention for producing rotomolded products 28. The installation has a plurality of processing devices 2, one of which being configured as a supply station 5.

The supply station 5 contains a robot 19 which fills the molding dies of the individual spherical receptacle members 1 in each case with a specific quantity of a respective specific type of raw material. This is performed in detail as follows: The supply station 5 has a plurality of storage containers 20 which are filled with different raw materials. In each case one a metering dispenser 21 is disposed on each storage container 20, said metering dispenser 21 being controlled such that the respective quantity of raw material required for a specific molding die is filled into a pot 22 which is located on a rotating plate 23. As soon as the pot after filling reaches the robot 19, the latter acquires the pot and pours the content into the assigned molding die of the spherical receptacle member 1 to be supplied. The spherical receptacle member 1 is then automatically closed, and makes its way along a roller ball track 17 to the further processing devices 2.

The installation has a first row 24 and a second row 25 of processing devices 2 which are in each case equipped with rotating stations 3 and cooling stations 4. Depending on the row 25, 26 in which there is sufficient immediately available capacity, it can be set by means of a control turnout 26 to which row the respective spherical receptacle member 1 that is to be fed to rotating and heating procedure is to make its way. After the cooling procedure in one of the cooling stations 4, the respective spherical receptacle member 1 makes its way into a buffer zone 27 and then to a retrieval station 6, where retrieving the finished rotomolded products 28 is performed. Said finished rotomolded products 28 are deposited by the robot 19 onto a transport belt 29 and subsequently sorted, in particular in an automatic manner, into transport boxes 30 provided.

Figure 6:
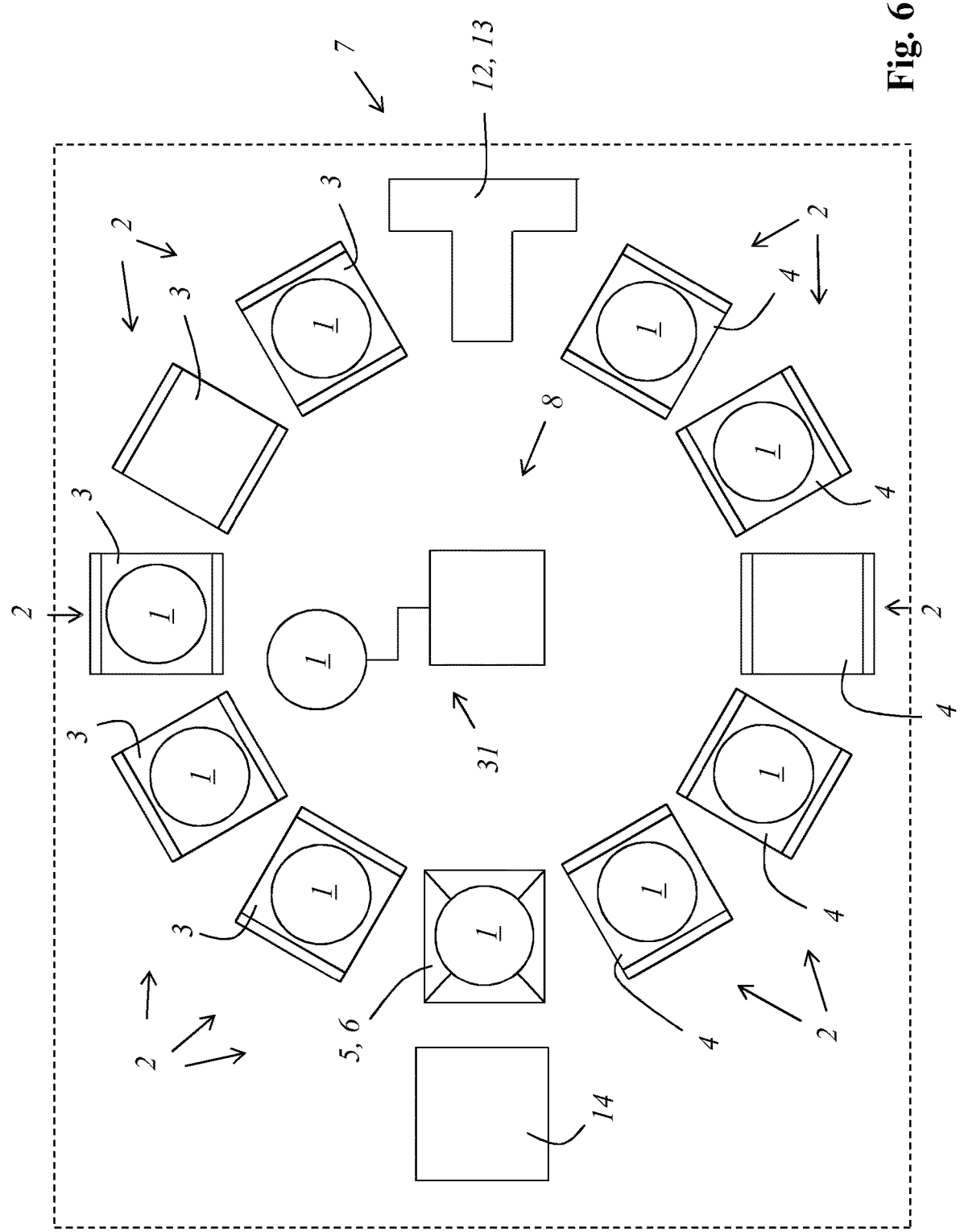
FIG. 6 shows a sixth exemplary embodiment of an installation according to the invention for producing rotomolded products.

FIG. 6 shows a sixth exemplary embodiment of an installation according to the invention for producing rotomolded products. The installation has a plurality of processing devices 2 which are set up in a circle. Also in this installation, there are processing devices 2 which are configured specifically as rotating stations 3, and processing devices 2 which are configured specifically as cooling stations 4. Moreover, there is a combined supply and retrieval station 5, 6 which has a retrieval robot 14. There is furthermore a lock 7 which functions as a lock entry station 12 as well as a lock exit station 13.

The conveyor 8 in the case of this embodiment is configured as an industrial robot. Such an embodiment has the very particular advantage that the conveyor can be adapted in a simple manner, in particular by simple reprogramming, when the installation is to be extended by adding of further processing devices, or is to be downsized by removing individual processing devices.

Figure 7:
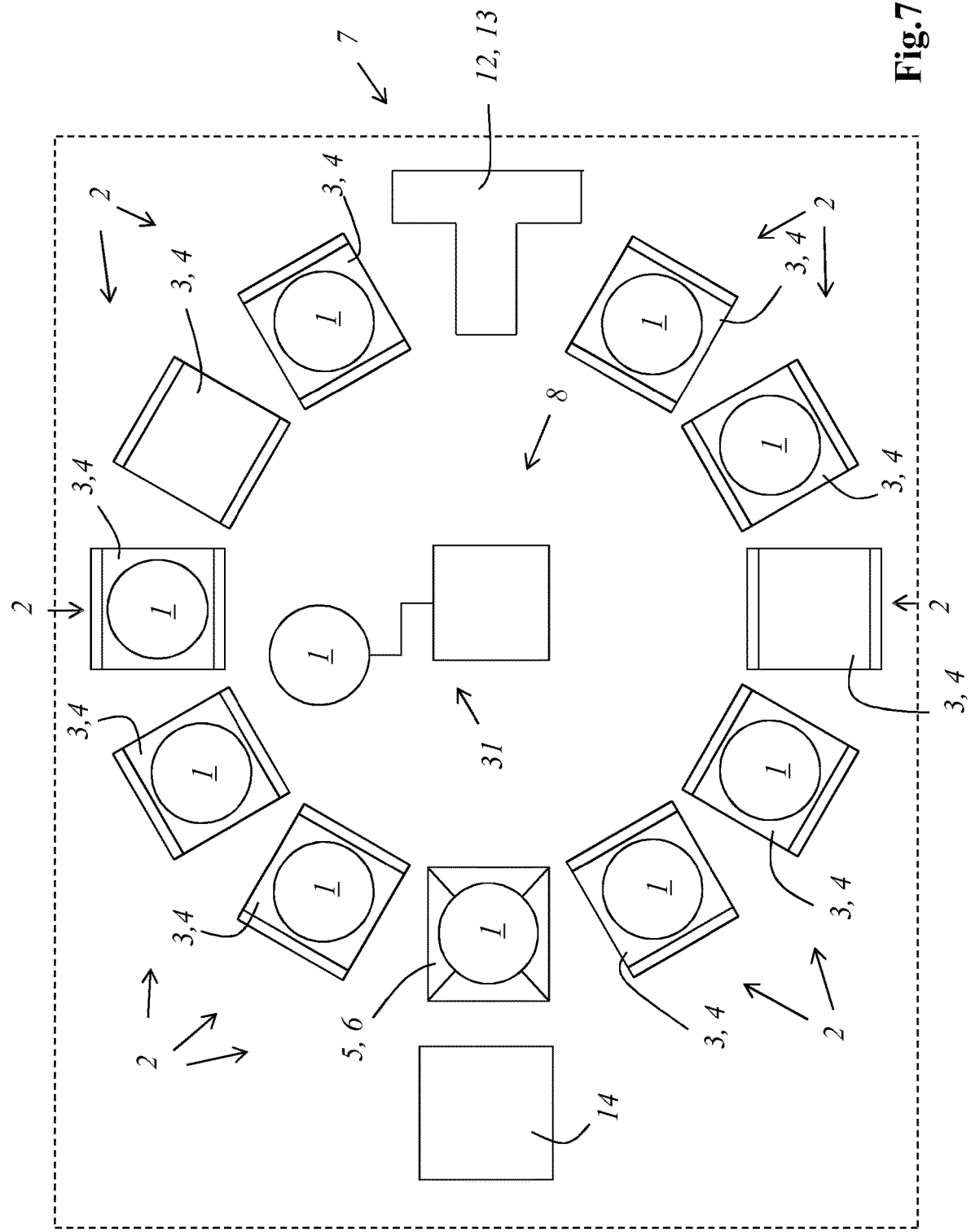
FIG. 7 shows a seventh exemplary embodiment of an installation according to the invention for producing rotomolded products.

FIG. 7 shows a seventh exemplary embodiment of an installation according to the invention for producing rotomolded products. The installation has a plurality of processing devices 2 which are set up in a circle.

Each of the processing devices 2 is configured to function as a rotating station 3 for heating and rotating in each case one spherical receptacle device 1, as well as a cooling station 4 for cooling in each case one of the spherical receptacle members 1. Cooling is preferably performed in each case while simultaneously rotating the spherical receptacle member. Rotating during cooling guarantees that the raw material is held in the desired shape on the internal wall of the molding die until a sufficient strength has been reached.

There is moreover a combined supply and retrieval station 5, 6 which has a retrieval robot 14. There is furthermore a lock 7 which functions as a lock entry station 12 as well as a lock exit station 13. The conveyor 8 in the case of this embodiment is configured as an industrial robot.

On account of each of the processing devices 2 being able to be used for heating as well as for cooling, fewer transport procedures are required because both processing steps can in each case be completed in the same processing device 2.

LIST OF REFERENCE SIGNS

1 Spherical receptacle member
2 Processing device
3 Rotating station
4 Cooling station
5 Supply station
6 Retrieval station
7 Lock
8 Conveyor
9 Guide track
10 Slide
11 Rotation axis
12 Lock entry station
13 Lock exit station
14 Retrieval robot
15 Transport arm
16 Transport arm
17 Ball track
18 Turnout
19 Robot
20 Storage container
21 Metering device
22 Pot
23 Rotating plate
24 First row
25 Second row
26 Control turnout
27 Buffer zone
28 Rotomolded products
29 Conveyor belt
30 Transport box
31 Industrial robot

What is claimed is:

1. An installation for producing rotomolded products by processing a plurality of spherical receptacle members, each of the spherical receptacle members being without a dedicated rotary drive and each of the spherical receptacle members having a molding die suppliable with raw material, the installation comprising:

a plurality of processing devices operable simultaneously and independently of one another, each of the processing devices being configured to receive any spherical receptacle member of the plurality of spherical receptacle members and to carry out at least one production step of a processing procedure using the received spherical receptacle member; and a conveyor operable to convey any of the plurality of spherical receptacle members to any of the plurality of processing devices for at least one production step of the processing procedure, and to retrieve any of the plurality of spherical receptacle members from any of the plurality of processing devices and convey the retrieved spherical receptacle member to any other of the plurality of processing devices which is vacant for a next production step of the processing procedure, wherein the conveyor is selected from the group consisting of a linear conveyor, rotatable transport arms, a roller ball track, and a robot;
wherein the plurality of processing devices includes a plurality of rotating stations each configured to simultaneously heat and rotate the spherical receptacle member received thereby, and to simultaneously cool and rotate the spherical receptacle member received thereby by blowing cool air on the spherical receptacle member received thereby while rotating the spherical receptacle member received thereby.

2. The installation as claimed in claim 1, characterized in that the plurality of processing devices are distributed over at least two different horizontal planes.

3. The installation as claimed in claim 1, wherein the plurality of processing devices includes at least one supply station configured to supply the molding die of the spherical receptacle member received thereby with raw material.

4. The installation as claimed in claim 3, wherein the at least one supply station is configured to automatically supply the molding die of the spherical receptacle member received thereby with raw material.

5. The installation as claimed in claim 3, wherein the at least one supply station is further configured as a retrieval station for retrieving a rotomolded product from the molding die of the spherical receptacle member received thereby.

6. The installation as claimed in claim 3, wherein the at least one supply station is not one of the plurality of rotating stations.

7. The installation as claimed in claim 3, wherein the at least one supply station is configured to supply the molding die of the spherical receptacle member received thereby with a specific type of raw material and a specific quantity of raw material.

8. The installation as claimed in claim 3, wherein the plurality of processing devices includes at least one retrieval station configured for retrieving a rotomolded product from the molding die of the spherical receptacle member received thereby.

9. The installation as claimed in claim 8, wherein the at least one retrieval station is configured for automatically retrieving a rotomolded product from the molding die of the spherical receptacle member received thereby.

10. The installation as claimed in claim 8, wherein the installation comprises at least one alignment device configured and disposed for orientating any of the plurality of spherical receptacle members in a specific alignment, wherein the at least one alignment device is part of the at least one retrieval station or is disposed directly on the at least one retrieval station.

11. The installation as claimed in claim 8, further comprising a conveyor control device configured to cause the conveyor to retrieve a first of the plurality of spherical receptacle members after a supply procedure at the at least one supply station, transfer that first spherical receptacle member to one of the plurality of rotating stations wherein that first spherical receptacle member is rotated in a rotating procedure, retrieve that first spherical receptacle member from that rotating station after the rotating procedure, and transfer that first spherical receptacle member to the at least one retrieval station.

12. The installation as claimed in claim 11, wherein that one rotating station impinges the molding die of that first spherical receptacle member with energy for a heating procedure while that one rotating station rotates that first spherical receptacle member, and the conveyor control device is configured to cause the conveyor to transfer that first spherical receptacle member to another one of the plurality of rotating stations for a cooling procedure to cool the molding die of that first spherical receptacle member and retrieve that first spherical receptacle member from the another one of the plurality of rotating stations after the cooling procedure before transferring that first spherical receptacle member to the at least one retrieval station.

13. The installation as claimed in claim 11, wherein the conveyor control device is configured to cause the conveyor to transfer, while that first spherical receptacle member is undergoing at least one production step in one of the plurality of processing devices, a second of the plurality of spherical receptacle members to another of the plurality of processing devices.

14. The installation as claimed in claim 11, wherein the conveyor control device is configured to cause the conveyor to retrieve, while that first spherical receptacle member is undergoing at least one production step in one of the plurality of processing devices, a second of the plurality of spherical receptacle members from another of the plurality of processing devices.

15. The installation as claimed in claim 1, wherein each of the plurality of processing devices is configured to receive only one of the plurality of spherical receptacle members at a time.

16. The installation as claimed in claim 1, wherein the plurality of processing devices includes a lock station configured and disposed for receiving any one of the plurality of spherical receptacle members from the conveyor to remove the received spherical receptacle member from the processing procedure, wherein the lock station is further configured to transfer the received spherical receptacle member back to the conveyor to return the received spherical receptacle member to the processing procedure.

17. The installation as claimed in claim 1, wherein the conveyor is an industrial robot.

18. The installation as claimed in claim 1, wherein the conveyor is configured to transport the plurality of spherical receptacle members asynchronously between the plurality of processing devices.

19. The installation as claimed in claim 1, wherein the installation comprises at least one alignment device configured and disposed for orientating any of the plurality of spherical receptacle members in a specific alignment.

20. The installation as claimed in claim 19, wherein the at least one alignment device is part of the conveyor or is disposed directly on the conveyor.

21. The installation as claimed in claim 1, wherein the installation includes a database in which each of the plurality of spherical receptacle members is individually assigned a set of processing parameters, and the plurality of processing devices adhere to the processing parameters assigned to the spherical receptacle member received thereby.

22. The installation as claimed in claim 21, wherein each of the plurality of spherical receptacle members is assigned a specific dedicated code, and wherein the individually assigned set of processing parameters of that spherical receptacle member is stored in the database and is retrievable by way of the dedicated code.

23. The installation as claimed in claim 22, wherein the dedicated code is a machine-readable code and each of the plurality of processing devices or a central control unit for the plurality of processing devices is configured to read the machine-readable code and retrieve the corresponding assigned set of processing parameters from the database.

24. The installation as claimed in claim 22, wherein the dedicated code is transmitted to a corresponding one of the plurality of processing devices or a central control unit for the plurality of processing devices by a transponder and the corresponding one of the plurality of processing devices or the central control unit for the plurality of processing devices is configured to receive the transmitted dedicated code and retrieve the corresponding assigned set of processing parameters from the database.

25. The installation as claimed in claim 21, wherein the set of processing parameters includes at least one of a rotation duration, a furnace temperature, an upper operating temperature of a corresponding one of the molding dies, a lower operating temperature of a corresponding one of the molding dies, a flow velocity of a hot airflow for heating a corresponding one of the molding dies, a flow velocity of a cold airflow for cooling a corresponding one of the molding dies, a hot air temperature, a cold air temperature, a rotational movement pattern, a heating time, a cooling time, a nominal alignment for a retrieval of the rotomolded product from a corresponding one of the spherical receptacle members, a nominal alignment for supplying a corresponding one of the molding dies with raw material, and a raw material property.

26. The installation as claimed in claim 25, wherein the raw material property is a raw material quantity, a raw material color, or a raw material type.

* * * * *